United States Patent
Choi

(10) Patent No.: US 10,616,358 B2
(45) Date of Patent: Apr. 7, 2020

(54) METHOD FOR PROVIDING PUSH NOTIFICATION AND ELECTRONIC DEVICE THEREOF

(71) Applicant: Samsung Electronics Co., Ltd., Gyeonggi-do (KR)

(72) Inventor: Jinwan Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 16/028,880

(22) Filed: Jul. 6, 2018

(65) Prior Publication Data

US 2019/0014187 A1 Jan. 10, 2019

(30) Foreign Application Priority Data

Jul. 6, 2017 (KR) .................. 10-2017-0085892

(51) Int. Cl.
*H04L 29/08* (2006.01)

(52) U.S. Cl.
CPC .............. *H04L 67/26* (2013.01); *H04L 67/34* (2013.01)

(58) Field of Classification Search
CPC ................................ H04L 67/26; H04L 67/34
USPC ......................................................... 709/206
See application file for complete search history.

(56) References Cited

U.S. PATENT DOCUMENTS

| | | | |
|---|---|---|---|
| 8,615,221 B1 | 12/2013 | Cosenza et al. | |
| 2007/0298770 A1* | 12/2007 | Lee | H04W 4/12 455/412.2 |
| 2008/0268895 A1* | 10/2008 | Foxenland | G01C 21/20 455/550.1 |
| 2010/0083142 A1 | 4/2010 | Patel et al. | |
| 2013/0219332 A1 | 8/2013 | Woley et al. | |
| 2014/0207916 A1 | 7/2014 | Li et al. | |
| 2014/0304700 A1* | 10/2014 | Kim | G06F 8/65 717/173 |
| 2015/0288640 A1* | 10/2015 | Lee | G06F 9/542 709/206 |
| 2015/0302493 A1* | 10/2015 | Batstone | G06Q 30/0601 705/26.1 |
| 2016/0086241 A1* | 3/2016 | Proulx | H04L 67/22 705/26.4 |
| 2016/0248865 A1 | 8/2016 | Dotan-Chohen et al. | |
| 2016/0249319 A1* | 8/2016 | Dotan-Cohen | H04M 3/42365 |
| 2016/0326912 A1* | 11/2016 | Abi-Rached | F01K 13/02 |

(Continued)

FOREIGN PATENT DOCUMENTS

KR    2000-0051354    8/2000

*Primary Examiner* — James E Springer
(74) *Attorney, Agent, or Firm* — The Farrell Law Firm, P.C.

(57) ABSTRACT

The present disclosure includes a method for providing a push notification and an electronic device thereof. The electronic device may include a display; a communication circuit configured to receive a push notification from a server; and a processor coupled with the display and the communication circuit. The processor is configured to obtain context information of the electronic device based on a specified exposure time of the push notification; determine whether a situation where the push notification is enabled to be output is detected, based on the context information; and display the push notification via the display when the situation where the push notification is enabled to be output is detected.

16 Claims, 12 Drawing Sheets

(56) References Cited

U.S. PATENT DOCUMENTS

2017/0336920 A1* 11/2017 Chan .................. G06Q 10/10
2018/0158046 A1 6/2018 Choi et al.

* cited by examiner

METHOD FOR PROVIDING PUSH NOTIFICATION AND ELECTRONIC DEVICE THEREOF

CROSS-REFERENCE TO RELATED APPLICATION(S)

This application is based on and claims priority under 35 U.S.C. § 119 to Korean Patent Application Serial No. 10-2017-0085892, filed on Jul. 6, 2017, in the Korean Intellectual Property Office, the disclosure of which is incorporated herein by reference.

BACKGROUND

1. Field

The present disclosure relates to a method and apparatus for providing a push notification in an electronic device.

2. Description of Related Art

As electronic devices such as smart phones and tablets are widely distributed, push services are utilized for various purposes. A push service refers to a service that provides users with a notification regarding various events occurring at each application or operating system (OS) of electronic devices. For example, the push service may utilize a push application to provide users with discount information of brands in a market application, a guide for a restaurant according to a specific location in a restaurant application, and an update notification for various applications and OSs.

Notification methods of the push service may include a method for directly outputting a push notification in an electronic device at the time of receiving the push notification from a server, and a method for outputting a push notification transmitted from the server after storing the push notification in the electronic device.

Since the push notification method of the push service outputs a push notification at the time of receiving the push notification or at a specified exposure time, there is a limit to effectively providing the push notification to a user. For example, if a push notification is displayed through a display when a user does not use an electronic device, there may be a problem that the user does not recognize whether the push notification is received. In another example, when a user uses a specific application, if a push notification having nothing to do with the corresponding application is displayed through a display, the corresponding push notification may be an unnecessary notification to the user.

SUMMARY

The present disclosure is provided to address at least the above-mentioned problems and/or disadvantages and to provide at least the advantages described below.

Accordingly, an aspect of the present disclosure provides a method and an apparatus for outputting a push notification in a situation where a user can identify the push notification, by considering a state of an electronic device or whether a specific application is executed. A push notification may be effectively provided to a user by displaying it on the display of the electronic device at a time the user can identify the push notification, such that a probability of identifying the corresponding push notification is increased and a use rate of an application or a service related to the push notification is enhanced.

In accordance with an aspect of the present disclosure, an electronic device includes a display; a communication circuit configured to receive a push notification from a server; and a processor coupled with the display and the communication circuit. The processor is configured to obtain context information of the electronic device based on a specified exposure time of the push notification; determine whether a situation where the push notification is enabled to be output is detected, based on the context information; and display the push notification via the display when the situation where the push notification is enabled to be output is detected.

In accordance with another aspect of the present disclosure, an operating method of an electronic device includes receiving a push notification from a server; obtaining context information of the electronic device based on an exposure time of the push notification; determining whether a situation where the push notification is enabled to be output is detected, based on the context information; and displaying the push notification through a display of the electronic device when the situation where the push notification is enabled to be output is detected.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
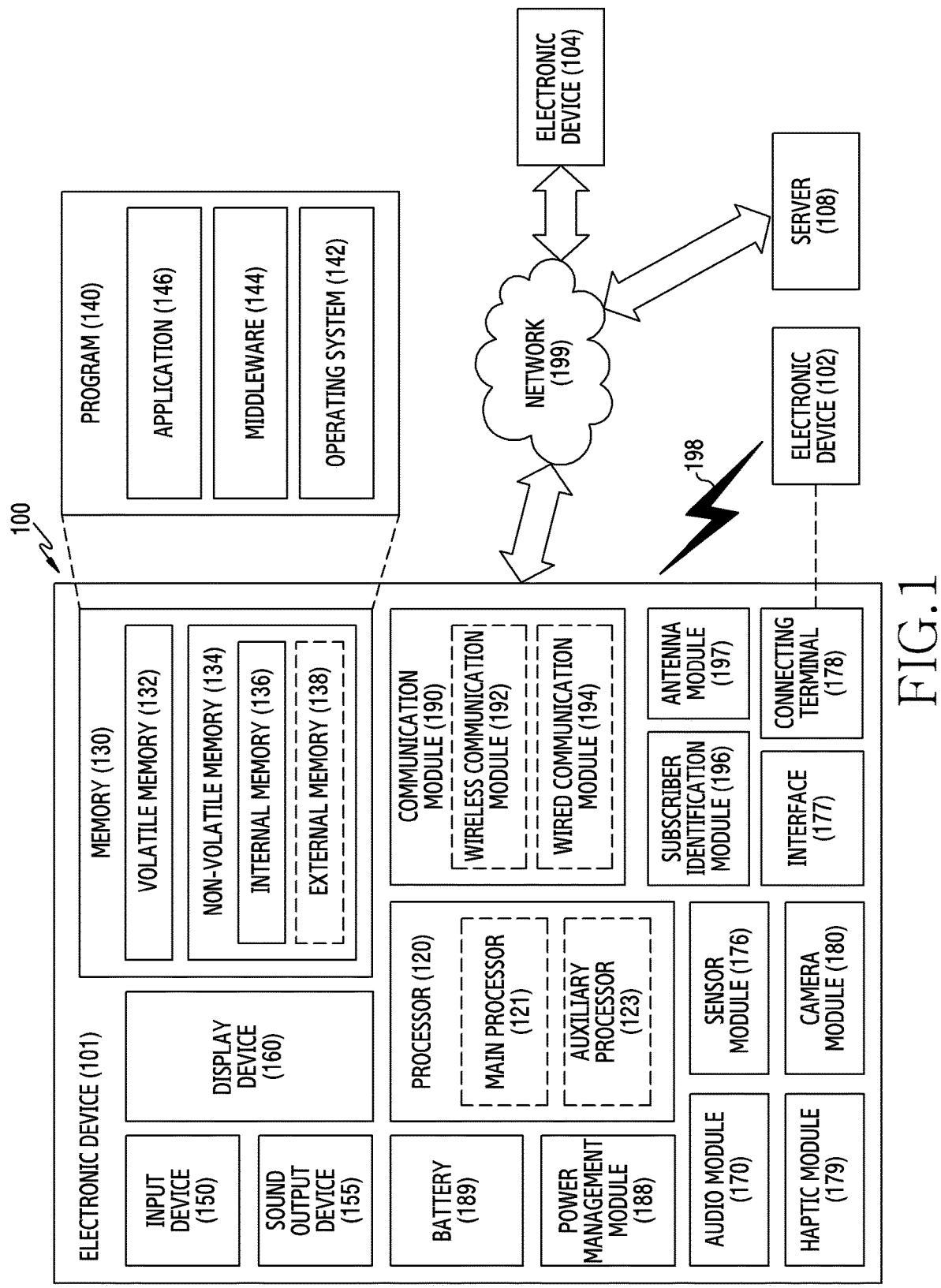
FIG. 1 is a block diagram illustrating an electronic device in a network environment, according to an embodiment.

FIG. 1 is a block diagram illustrating an electronic device 101 in a network environment 100, according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or adapted to be specific to a specified function. The auxiliary processor 123 may be implemented as separate from, or as a part of the main processor 121.

The auxiliary processor 123 may control at least some functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

According to an embodiment of the present disclosure, when a push notification is received from the server 108, the processor 120 may determine whether a situation for displaying the push notification is detected based on context information, and, when the situation for displaying the push notification is detected, the processor 120 may process an operation related to displaying of the push notification. When an input for requesting a renotification of the push notification displayed on the display device 160 is detected, the processor 120 may determine a renotification time of the push notification, and may process an operation related to displaying of the push notification according to the renotification time of the push notification.

The program 140 may be stored in the memory 130 as software, and may include, for example, an OS 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing a record, and the receiver may be used for incoming calls. According to an embodiment, the receiver may be implemented as separate from, or as part of the speaker.

The display device 160 may visually provide information to the user of the electronic device 101. The display device 160 may include, for example, a display, a hologram device, or a projector and control circuitry to control a corresponding device. According to an embodiment, the display device 160 may include touch circuitry or a pressure sensor adapted to measure the intensity of force incurred by a touch.

The audio module 170 may convert a sound into an electrical signal and vice versa. According to an embodiment, the audio module 170 may obtain the sound via the input device 150, or output the sound via the sound output device 155 or an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state (e.g., power or temperature) of the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101, and may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a wired or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules 190 may be implemented as a single component (e.g., a single chip), or may be implemented as multi chips separate from each other.

According to an embodiment, the wireless communication module 192 may identify and authenticate the electronic device 101 in a communication network, using user information stored in the SIM 196.

The antenna module 197 may include one or more antennas to transmit or receive a signal or power to or from the outside (e.g., the external electronic device) of the electronic device 101. According to an embodiment, the communication module 190 (e.g., the wireless communication module 192) may transmit or receive a signal to or from the external electronic device through an antenna appropriate for a communication scheme.

At least some of the above-described components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type from, the electronic device 101. According to an embodiment, all or some of operations to be executed at the electronic device 101 may be executed at one or more of the external electronic devices. According to an embodiment, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the present disclosure, the electronic devices are not limited to those described above.

It should be appreciated that various embodiments of the present disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "at least one of" "A, B, or C," "A, B, and C," or "at least one of A, B, or C" may include all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a machine-readable storage medium (e.g., internal memory 136 or external memory 138) that is readable by a machine (e.g., the electronic device 101). For example, a processor of the machine may invoke an instruction stored in the storage medium, and execute it, with or without using one or more other components under the control of the processor. This allows the machine to be operated to perform at least one function according to the instruction invoked. The instruction may include a code generated by a complier or a code executable by an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Additionally or alternatively, a plurality of components (e.g., modules or programs) may be integrated into a single component. In such a case, according to various embodiments, the integrated component may still perform one or more functions of each of the plurality of components in the same or a similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, the electronic device 101 may include the display device 160, a communication circuit (e.g., the communication module 190) configured to receive a push notification from the server 108, and the processor 120 coupled with the display device 160 and the communication circuit. The processor 120 may be configured to obtain context information of the electronic device 101 based on a specified exposure time of the push notification; determine whether a situation where the push notification is enabled to be output is detected, based on the context information; and display the push notification via the display of the electronic device 101 when the situation where the push notification is enabled to be output is detected.

The push notification may include information related to at least one of exposure-related information or a characteristic category, and the context information of the electronic device 101 may include at least one of information for determining whether the electronic device 101 is used, or information regarding an application which is executed in the electronic device 101.

When the push notification is received, the processor 120 may be configured to identify the exposure-related information of the push notification, and the exposure-related information may include at least one of an exposure time, a valid time, a main text message, or a priority.

When the situation where the push notification is enabled to be output is not detected, the processor 120 may be configured to determine whether the valid time arrives, and, when the valid time arrives, the processor may be configured to display the push notification via the display.

The processor 120 may be configured to identify the characteristic category of the push notification, and, when the characteristic category is an event notification, to obtain the context information.

When the push notification is an update notification, the processor 120 may be configured to identify an update setting of the electronic device, and to obtain the context information based on the update setting.

When information regarding a weighted situation is received from the server through the communication circuit, the processor 120 may be configured to obtain the context information based on the information regarding the weighted situation.

The processor 120 may be configured to obtain the context information regarding the weighted situation for a specified time, and, when the weighted situation is not detected for the specified time, to obtain context information related to the situation where the push notification is enabled to be output.

When an input for identifying the push notification is detected, the processor 120 may be configured to transmit information regarding a situation where the push notification is displayed to the server through the communication circuit.

When an input for requesting a renotification of the push notification is received, the processor 120 may be configured to determine a renotification time of the push notification. When the renotification time is to arrive earlier than the valid time, the processor may be configured to display the push notification via the display at the renotification time, and, when the renotification time is to arrive later than the valid time, the processor may be configured to display the push notification via the display at the valid time.

Figure 2:
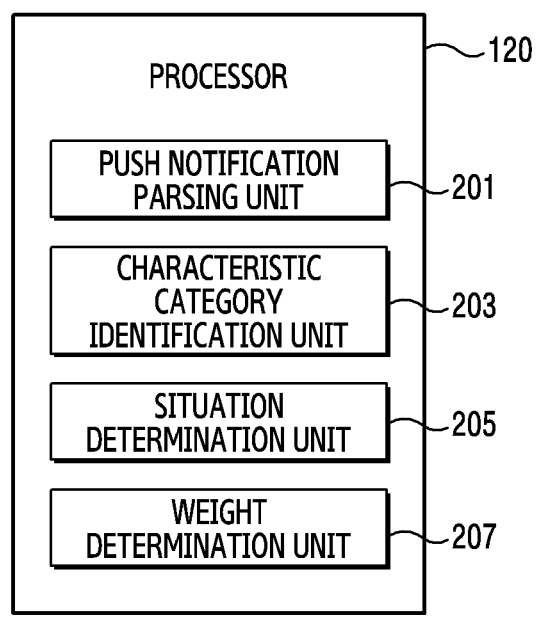
FIG. 2 is a view illustrating a configuration of a processor of an electronic device, according to an embodiment.

FIG. 2 is a block diagram illustrating a configuration of the processor of the electronic device, according to an embodiment.

Referring to FIG. 2, the processor 120 includes at least one of a push notification parsing unit 201, a characteristic category identification unit 203, a situation determination unit 205, or a weight determination unit 207.

The push notification parsing unit 201 may identify exposure-related information of a push notification. The exposure-related information of the push notification may include information related to at least one of an exposure time of the push notification, a valid time of the push notification, a main text message (for example, a text or an image) of the push notification, and a priority of the push notification. The exposure time of the push notification may indicate a time that the push notification has validity. For example, an exposure time of a push notification for guiding sales of products may indicate a time that is a specified time (e.g., 10 minutes) earlier than a time that the sales of the products start. The valid time of the push notification may indicate a time that the push notification is valid until it expires. For example, the valid time of the push notification for guiding the sales of the products may indicate a time that is a specified time (e.g., 10 minutes) earlier than a time that the sales of the products finish. The main text message of the push notification may indicate a text or an image that the corresponding push message intends to deliver. The priority of the push notification may be information that is used for determining a notification to be displayed on the display device 160 preferentially when only some of a plurality of push notifications are allowed to be displayed on the display device 160, and may indicate an importance of the push notification.

When information regarding a weighted situation is received from the server 108, the push notification parsing unit 201 may identify the weight regarding the corresponding situation based on the received information. For example, the push notification parsing unit 201 may identify a weight of a situation where a telephone application is terminated, based on the information received from the server 108. In another example, the push notification parsing unit 201 may identify a weight of a situation where a screen of an application associated with the push notification is displayed, based on the information received from the server 108. The weighted situation may indicate a situation where the user is most likely to identify a push notification, among situations where a push notification can be output. The weighted situation may be received along with the push notification or may be received independently from the push notification.

The characteristic category identification unit 203 may identify a characteristic category of the push notification. For example, the characteristic category identification unit 203 may determine whether the push notification is related to an event or an update. The notification related to the event may include a push notification such as an advertisement, a service guide, or a notice. The notification related to the update may include a push notification such as an update of each application or an update of an operation system.

The situation determination unit 205 may detect whether the electronic device is in a situation where the push notification can be output. The situation determination unit 205 may determine whether the exposure time of the push notification arrives. When the exposure time of the push notification arrives, the situation determination unit 205 may detect a situation where the electronic device 101 is used by the user. For example, the situation determination unit 205 may detect at least one of a situation where the user stares at the display device 160, a situation where the display device 160 is turned on, or a situation where an input of the user is received. When the exposure time of the push notification arrives, the situation determination unit 205 may detect a situation where the corresponding push notification can be output. When the situation where the push notification can be output is detected, the situation determination unit 205 may control the display 160 to output the push notification promptly.

When information regarding a weighted situation is received from the server 108, the situation determination unit 205 may determine whether the electronic device is in the weighted situation, by obtaining context information related to the weighted situation for a specified time (e.g., 10 minutes). For example, when the weighted situation is the situation where the user stares at the display device 160, the situation determination unit 205 may obtain information regarding whether the user stares at the screen by using a camera, an infrared sensor, or an iris sensor for a specified time. When the situation where the user stares at the screen is detected for the specified time, the situation determination unit 205 may control the display device 160 to promptly display the push notification. When the situation where the user stares at the screen is not detected for the specified time, the situation determination unit 205 may determine whether the situation where the push notification can be output is detected, by obtaining both additional context information regarding a situation that is not given a weight, and context information related to the weighted situation.

The weight determination unit 207 may detect an input for identifying the push notification. For example, the weight determination unit 207 may determine whether an input for identifying the push notification displayed on the display device 160 is detected through the input device 150 or the display device 160 of the electronic device for a specified time (e.g., 10 seconds). In response to the input for identifying the push notification being detected, the weight determination unit 207 may transmit, to the server 108 through the communication module 190, information regarding the situation where the push notification is displayed, in order to allow a weight to be reflected on the situation where the push notification is displayed. According to an embodiment, the weight determination unit 207 may transmit, to the server 108 through the communication module 190, not only the information regarding the situation where the push notification is displayed, but also identification information of the electronic device 101 (or the user of the electronic device 101). In this case, the server 108 may determine a weighted situation for each electronic device, by using the user's identification information, and then may transmit the determined information to each electronic device.

Figure 3:
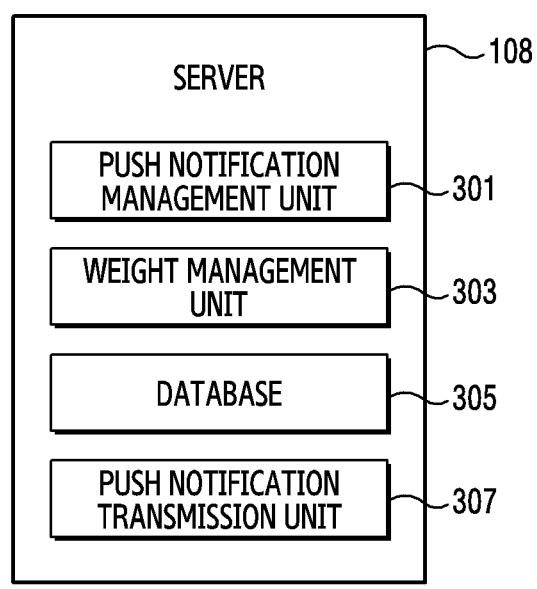
FIG. 3 is a view illustrating a configuration of a server, according to an embodiment.

FIG. 3 is a block diagram illustrating a configuration of the server, according to an embodiment.

Referring to FIG. 3, the server 108 includes at least one of a push notification management unit 301, a weight management unit 303, a database 305, or a push notification transmission unit 307.

The push notification management unit 301 may register a push notification. For example, the push notification management unit 301 may receive, from an electronic device (e.g., the electronic device 101 or 102) for registering a push notification, information regarding at least one of a main text message of the push notification, an exposure time of the push notification, a valid time of the push notification, a priority of the push notification, a characteristic category of the push notification, or identification information of the electronic device (or the user of the electronic device) to which the push notification is to be transmitted. The push notification management unit 301 may register the push notification by storing the received information in the database 305.

When information regarding a situation where a push notification is displayed is received from electronic devices (e.g., the electronic device 101 or 104), the weight management unit 303 may determine a situation that is to be weighted, based on the received information. For example, when information related to a situation where a user's input is detected is received from the electronic device, the weight management unit 303 may update a weight on the situation where the user's input is detected in the database 305. In another example, when information related to a situation where a telephone application terminates is received from the electronic device, the weight management unit 303 may update a weight on the situation where the telephone application terminates in the database 305. Accordingly, the weight management unit 303 may update weights on respective situations where the push notification can be output, which are stored in the database 305, based on information received from the electronic devices. The weight management unit 303 may determine a situation having the highest weight among the situations where the push notification can be output, as the situation that is to be weighted.

The database 305 may store information related to the push notification. According to an embodiment, the database 305 may store information regarding situations where the push notification can be output and information regarding the weighted situation.

The push notification transmission unit 307 may schedule the push notification based on the information related to the push notification, which is stored in the database 305, and may provide the push notification to the electronic device 101. For example, the push notification transmission unit 307 may identify the identification information of the electronic device (for example, the electronic device 101) to which the push notification is to be transmitted, from the information related to the push notification, stored in the database 305. When the identification information of the electronic device which has transmitted the push notification is identified, the push notification transmission unit 307 may transmit the push notification to the electronic device (for example, the electronic device 101). In this case, the transmitted push notification may include at least one of an exposure time of the push notification, a valid time of the push notification, a priority of the push notification, a main text message of the push notification, or a characteristic category of the push notification. When a transmission time of the push notification is included in the information related to the push notification, stored in the database 305, the push notification transmission unit 307 may transmit the push notification at a time when the transmission time of the push notification arrives. When the transmission time of the push notification is not included in the information related to the push notification, stored in the database 305, the push notification transmission unit 307 may transmit the push notification at a time when the registration of the push notification is completed or at a specific time.

When the information regarding the weighted situation is stored in the database 305, the push notification transmission unit 307 may provide the information regarding the weighted situation along with the push notification.

Figure 4:
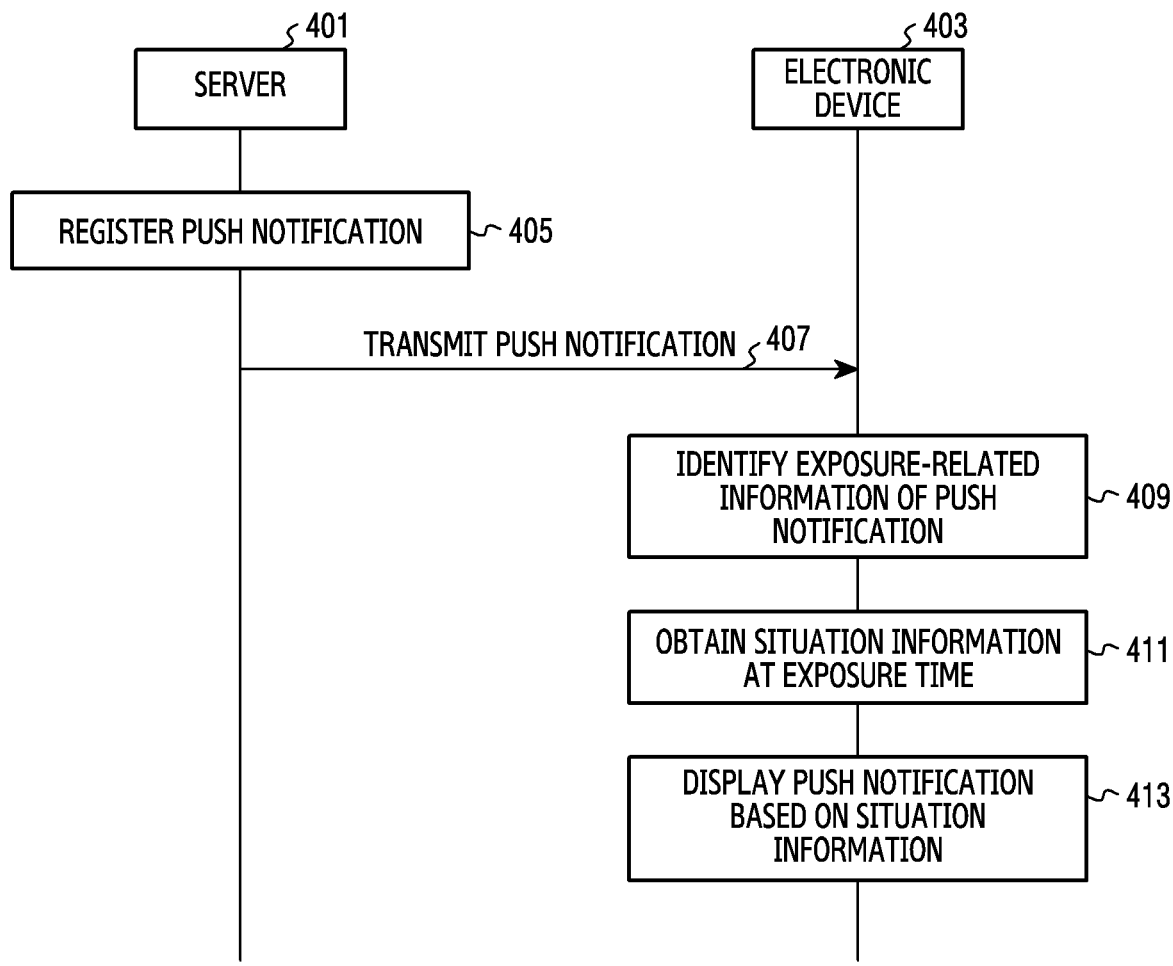
FIG. 4 is a view illustrating an example of a system for providing a push notification, according to an embodiment.

FIG. 4 is a view showing an example of a system for providing a push notification, according to an embodiment.

Referring to FIG. 4, in operation 405, a server 401 (e.g., the server 108) registers a push notification. For example, the server 401 may register the push notification based on information received from an electronic device (e.g., the electronic device 101 or 104). The information received from the electronic device may include at least one of a transmission time of the push notification, exposure-related information of the push notification (e.g., an exposure time of the push notification, a valid time of the push notification, a main text message of the push notification, or a priority of the push notification), a characteristic category of the push notification, or identification information (e.g., a user) of an electronic device 403 (e.g., the electronic device 101) to which the push notification is to be transmitted.

In operation 407, the server 401 transmits the push notification to the electronic device 403. For example, when there is a time to transmit the push notification, the server 401 may schedule the push notification based on the transmission time of the push notification and the identification information of the electronic device 403 to which the push notification is to be transmitted. When the time to transmit the push notification arrives, the server 401 may transmit the push notification to the electronic device 403. In another example, when there is no time to transmit the push notification, the server 401 may transmit the push notification based on the identification information of the electronic device 403, to which the push notification is to be transmitted, at the time when the push notification is registered. The push notification transmitted to the electronic device 403 may include at least one of the exposure-related information of the push notification or the characteristic category of the push notification.

In operation 409, the electronic device 403 identifies the exposure-related information of the push notification. For example, when the push notification is received from the server 401, the electronic device 403 may identify at least one of the exposure time of the push notification, the valid time of the push notification, the main text message of the push notification, or the priority of the push notification.

In operation 411, the electronic device 403 obtains context information at the exposure time of the push notification. For example, when the exposure time of the push notification arrives, the electronic device 403 may obtain information for determining whether the electronic device 403 is used, information regarding an application which is being executed in the electronic device 403, or information regarding an application which is displayed on the screen of the electronic device 403.

In operation 413, the electronic device 403 displays the push notification based on the context information. For example, the electronic device 403 may determine whether a situation where the push notification can be output is detected, based on the context information. When the situation where the push notification can be output is detected, the electronic device 403 may display the push notification. The situation where the push notification can be output may include a situation where the electronic device 403 is used by the user or a situation where a screen of an application related to the push notification is displayed on the electronic device 403. The situation where the electronic device 403 is used by the user may include a situation where the screen of the electronic device 403 is turned on, a situation where the user stares at the screen of the electronic device 403, or a situation where a user input is received.

In the above-described example, the server transmits the push notification to one electronic device. However, according to various embodiments of the present disclosure, the server may transmit the push notification to a plurality of electronic devices. For example, where there are two or more pieces of identification information of electronic devices to which the push notification is to be transmitted, the server 401 may transmit the push notification to the two or more electronic devices.

Figure 5:
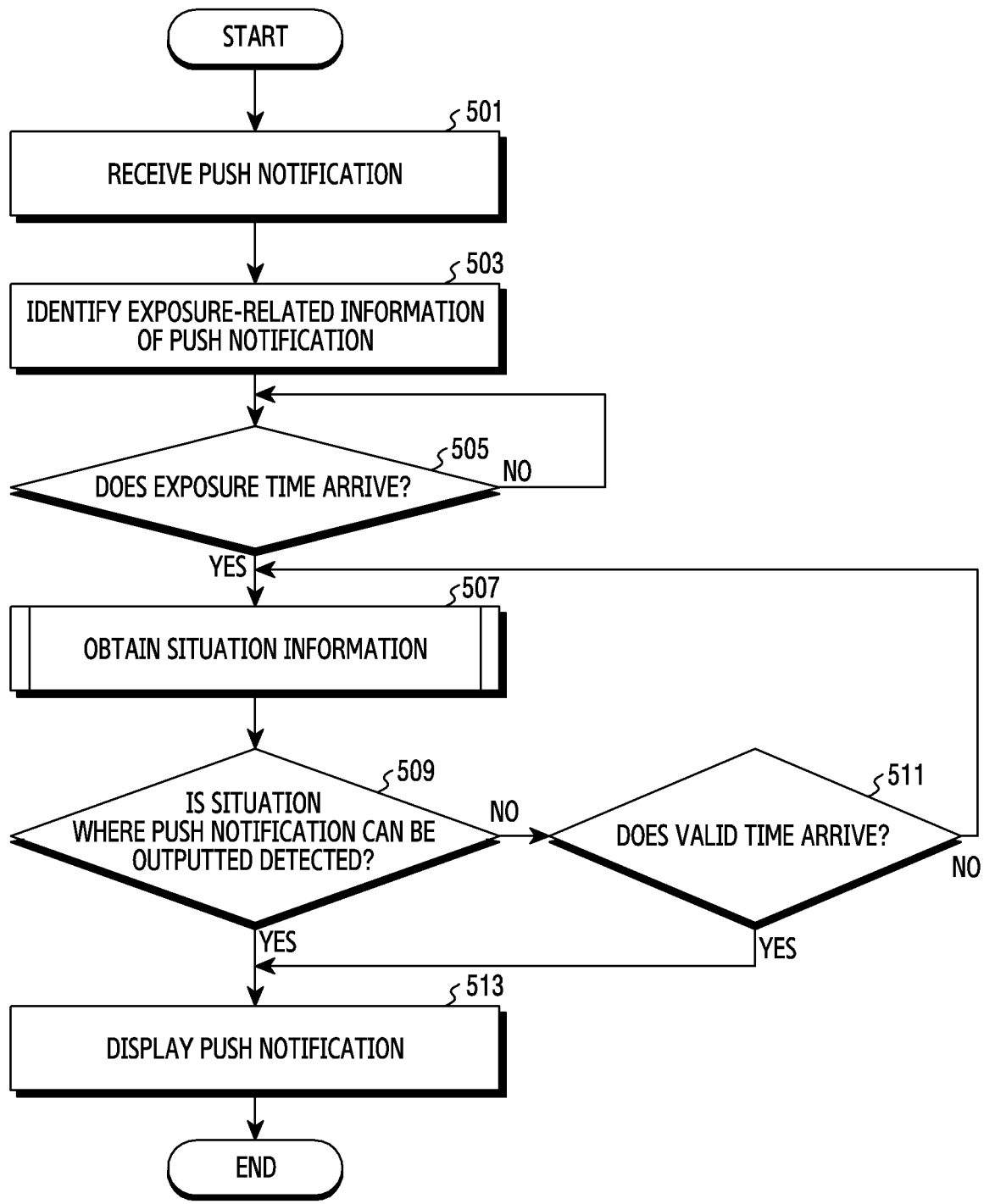
FIG. 5 is a flowchart of a method for displaying a push notification through a screen of an electronic device in the electronic device, according to an embodiment.

FIG. 5 is a flowchart of a method for displaying a push notification through a screen of an electronic device in the electronic device, according to an embodiment.

In operation 501, the processor 120 receives a push notification through the communication module 190. The push notification may include at least one of exposure-related information of the push notification (e.g., an exposure time of the push notification, a valid time of the push notification, a main text message of the push notification, or a priority of the push notification) or a characteristic category of the push notification.

In operation 503, the processor 120 identifies the exposure-related information of the push notification. For example, the processor 120 may identify at least one of the exposure time of the push notification, the valid time of the push notification, the main text message of the push notification, or the priority of the push notification, by parsing the received push notification.

In operation 505, the processor 120 determines whether the exposure time of the push notification arrives. For example, the processor 120 may determine whether a current time reaches the exposure time. When it is determined that the current time does not reach the exposure time, the processor 120 performs operation 505 again to determine whether the exposure time of the push notification arrives.

When it is determined that the exposure time of the push notification arrives (Yes in operation 505), the processor 120 obtains context information of the electronic device 101 in operation 507. For example, the processor 120 may obtain information for determining whether the electronic device 101 is used or information regarding an application which is being executed in the electronic device 101. The information for determining whether the electronic device 101 is used may include, for example, at least one of information related to a state (e.g., on/off) of the display device 160, information for determining whether the user stares at the screen, or information regarding whether a user input is received.

In operation 509, the processor 120 determines whether the situation where the push notification can be output is detected, based on the context information. For example, the processor 120 may determine whether the situation where the display device 160 is turned on is detected, based on the information for determining whether the display device 160 is used. In another example, the processor 120 may determine whether the situation where the user stares at the display device 160 is detected, based on the information for determining whether the user stares at the screen. In another example, the processor 120 may determine whether a user input is received, based on the information regarding whether the user input is received. In another example, the processor 120 may determine whether a situation where an application related to the push notification is being executed in the background or the screen of the application related to the push notification is displayed is detected, based on the information regarding the application which is being executed in the electronic device 101.

When the situation where the push notification can be output is not detected (No in operation 509), the processor 120 determines whether the valid time of the push notification arrives in operation 511. For example, when the push notification is valid until a specific time, and the push notification is displayed after the specific time, the corresponding push notification may be an unnecessary notification to the user. Accordingly, the processor 120 may determine whether the current time reaches the valid time of the push notification, in order to display the push notification until the time that the push notification is valid. When the current time does not reach the valid time, the processor 120 returns to operation 507 to obtain the context information of the electronic device.

When the situation where the push notification can be output is detected (Yes in operation 509) or when it is determined that the valid time of the push notification arrives (Yes in operation 511), the processor 120 displays the push notification in operation 513. For example, when the electronic device 101 is used by the user, the processor 120 may control the display device 160 to display the push notification. In another example, when the screen of the application related to the push notification is displayed on the electronic device 101, the processor 120 may control the display device 160 to display the push notification. According to various embodiments, when the number of push notifications that should be displayed is larger than the number of push notifications that are displayable on the display device 160, the processor 120 may control the display device 160 to display at least a portion of the plurality of push notifications. For example, the processor 120 may select as many push notifications as a number of push notifications specified according to the priorities of the plurality of push notifications or a maximum number of push notifications displayable on the display device 160. The processor 120 may control the display device 160 to display the selected push notification. In another example, the processor 120 may select as many push notifications as a number of push notifications specified from the plurality of push notifications in order from the earliest valid time, or the maximum number of push notifications displayable on the display device 160. The processor 120 may control the display device 160 to display the selected push notification.

In the above-described example, the push notification is displayed via the display device 160. However, according to various embodiments of the present disclosure, the push notification may be output in different methods. For example, the processor 120 may output the push notification by controlling a motor to output a vibration a specified number of times. In another example, the processor 120 may output the push notification by controlling the sound output device 155 to output a notification sound.

Additionally, the output method of the push notification may be changed according to an operation mode of the electronic device. For example, when the electronic device operates in a silent mode, the processor 120 may control the display device 160 and the sound output device 155 to display the push notification without a notification sound (sound effect), and, when the electronic device does not operate in the silence mode, the processor 120 may control the display device 160 and the sound output device 155 to display the push notification and to output the notification sound.

Figure 6:
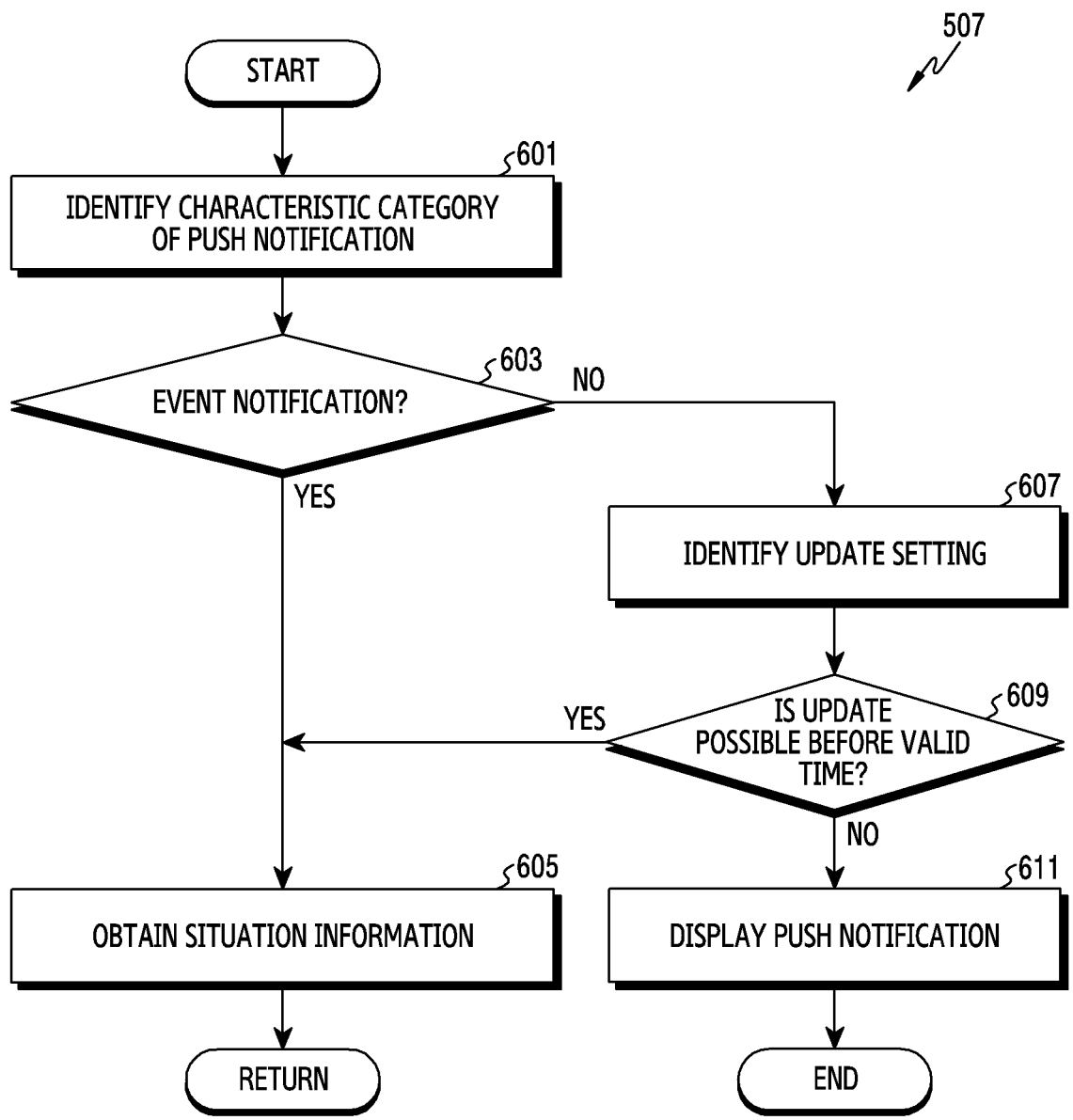
FIG. 6 is a flowchart of a method for obtaining context information in the electronic device, according to an embodiment.

FIG. 6 is a flowchart of a method for obtaining context information in an electronic device, according to an embodiment.

Referring to FIG. 6, in operation 601, the processor 120 identifies a characteristic category of a push notification. For example, the processor 120 may identify information related to the characteristic category by parsing the push notification. The characteristic category of the push notification is information for determining whether the push notification is an event notification or an update notification, and may be added to the push notification when the push notification is registered.

In operation 603, the processor 120 determines whether the characteristic category of the push notification is an event notification. For example, when the push notification is related to an advertisement, a service guide, or a notice, the processor 120 may determine that the corresponding push notification is the event notification. In another example, when the push notification is related to an update of an application or an update of an operation system, the processor 120 may determine that the push notification is the update notification.

When it is determined that the push notification is the event notification (Yes in operation 603), the processor 120 obtains context information in operation 605. According to an embodiment, the processor 120 may obtain information for determining whether the electronic device 101 is used. For example, the processor 120 may obtain information related to a state (e.g., on/off) of the display device 160. In another example, when the display device 160 is turned on or the screen of the electronic device 101 is unlocked, the processor 120 may obtain information regarding whether the user stares at the display device 160 of the electronic device 101 by using a camera, an infrared sensor, or an iris sensor. In another example, when the display device 160 is turned on or the screen of the electronic device 101 is unlocked, the processor 120 may obtain information regarding whether a user's input is received. According to an embodiment, when the display device 160 is turned on or the screen of the electronic device 101 is unlocked, the processor 120 may obtain information regarding an application which is being executed in the electronic device 101.

When it is determined that the push notification is not the event notification (No in operation 603), the processor 120 identifies an update setting of the electronic device 101 in operation 607. For example, when the push notification is the update notification, the processor 120 may identify an update setting of the electronic device 101, such as a time during which the display of the update notification is allowed (e.g., from 9 p.m. to 11 p.m.), through the update setting of the electronic device 101. In another example, the processor 120 may identify a battery state in which the display of the update notification is allowed (e.g., a state in which a remaining capacity of the battery exceeds a reference remaining capacity (30%) by which the OS can be updated, or a state in which the battery is being charged).

In operation 609, the processor 120 determines whether an update is possible before a valid time based on the update setting. For example, the processor 120 may determine whether the update is possible by comparing the valid time of the push notification and the time during which the display of the update notification is allowed. When the valid time of the push notification is to arrive later than the time during which the display of the update notification is allowed, the processor 120 may determine that the update is possible. In another example, when the remaining capacity of the battery of the electronic device 101 exceeds the reference remaining capacity or the battery of the electronic device 101 is being charged before the valid time arrives, the processor 120 may determine that the update is possible. When it is determined that the update is possible, the processor 120 performs operation 605 of obtaining context information.

When it is determined that the update is not possible before the valid time (No in operation 609), the processor 120 displays the push notification in operation 611. For example, when the valid time of the push notification is to arrive earlier than the time during which the display of the update notification is allowed, the processor 120 may control the display device 160 to promptly display the push notification. In another example, when the remaining capacity of the battery of the electronic device 101 is lower than or equal to the reference remaining capacity of the battery or the battery of the electronic device is not being charged, the processor 120 may control the display device 160 to promptly display the push notification.

Figure 7:
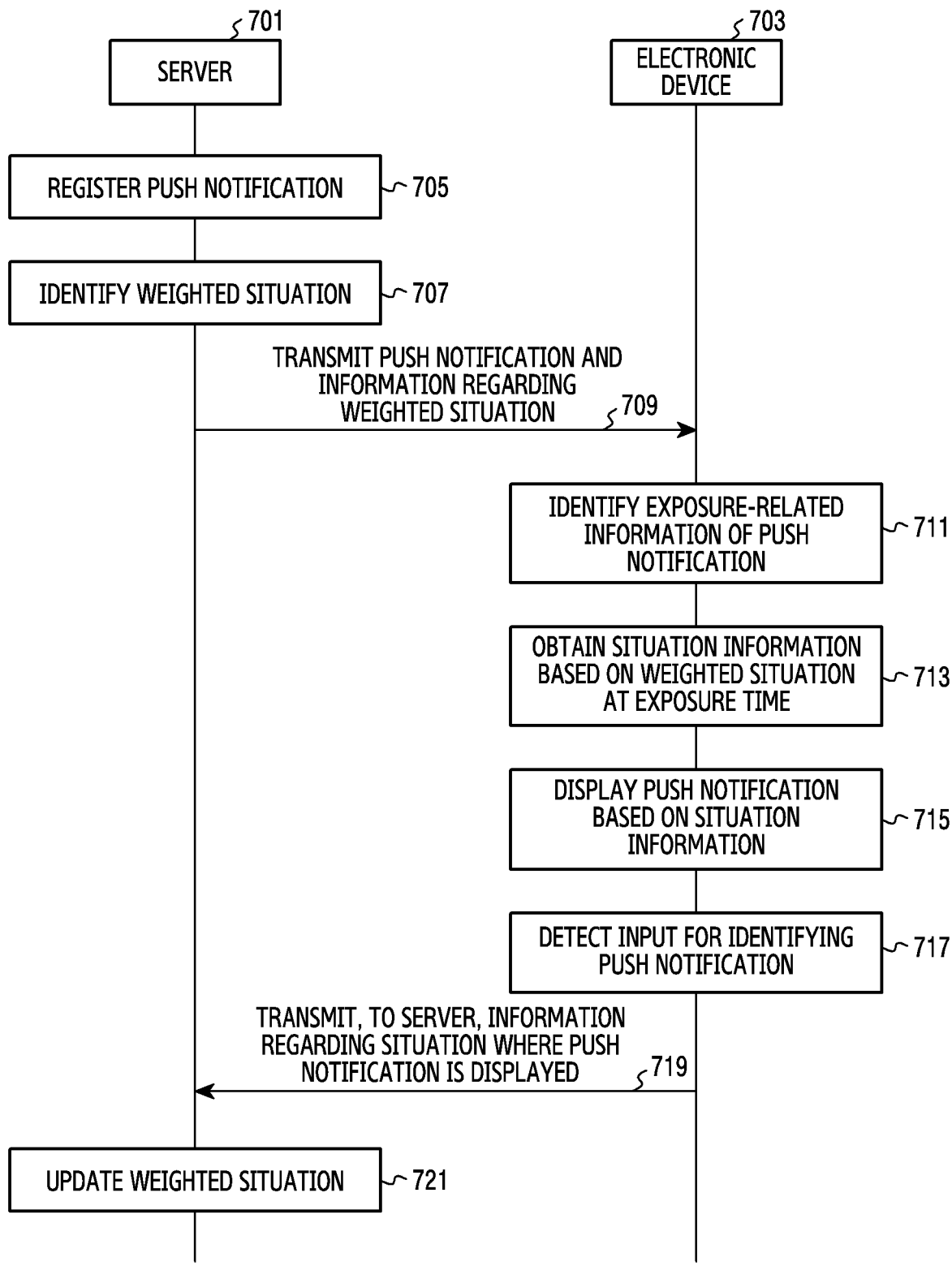
FIG. 7 is a view illustrating an example of a system for providing a push notification in an electronic device, according to an embodiment.

FIG. 7 is a view showing an example of a system for providing a push notification in an electronic device, according to an embodiment.

Referring to FIG. 7, in operation 705, a server 701 (e.g., the server 108) registers a push notification. For example, the server 701 may receive information related to a push notification from an electronic device (e.g., the electronic device 101 or 104) as in operation 401 of FIG. 4, and may register the push notification by storing the received information. Herein, the information related to the push notification may include at least one of a transmission time of the push notification, exposure-related information of the push notification, a characteristic category of the push notification, or identification information (e.g., user of an electronic device) of an electronic device (for example, an electronic device 703) to which the push notification is to be transmitted.

In operation 707, the server 701 identifies a weighted situation. For example, when the transmission time of the push notification arrives, the server 701 may identify a situation having the highest weight among situations where the stored push notification can be output.

In operation 709, the server 701 transmits the push notification and information regarding the weighted situation to the electronic device 703 (e.g., the electronic device 101). The push notification may include information related to at least one of the exposure-related information (e.g., an exposure time of the push notification, a valid time of the push notification, a main text message of the push notification, or a priority of the push notification) or a characteristic category.

In operation 711, the electronic device 703 identifies the exposure-related information of the push notification by parsing the push notification transmitted from the server. For example, the electronic device 703 may identify at least one of the exposure time of the push notification, the valid time of the push notification, the main text message of the push notification, or the priority of the push notification.

In operation 713, the electronic device 703 obtains context information based on the weighted situation at the exposure time of the push notification. For example, when the exposure time arrives, the electronic device 703 may obtain context information related to the weighted situation, in order to determine whether the weighted situation is detected for a specified time. When the weighted situation is not detected for the specified time, the electronic device 703 may obtain additional context information related to a situation that is not given a weight, along with the information of the weighted situation, in order to determine whether a situation where the push notification can be output is detected.

In operation 715, the electronic device 703 displays the push notification based on the context information. For example, when the weighted situation is detected within the specified time, the electronic device 703 may display the push notification. In another example, when the situation where the push notification can be output is detected after the specified time, the electronic device 903 may display the push notification.

In operation 717, the electronic device 703 detects an input for identifying the push notification. For example, the electronic device 703 may detect a touch input (e.g., a tap touch input or a swipe input) on the push notification displayed on the screen of the electronic device 703. In this case, the electronic device 703 may execute a function corresponding to the push notification. For example, the electronic device 703 may execute an application corresponding to the push notification.

In operation 719, the electronic device 703 transmits information regarding the situation where the push notification is displayed to the server 701. For example, when the push notification is displayed according to detection of the user's input, the electronic device 703 may transmit information regarding the situation where the user's input is detected to the server 701. In another example, when the push notification is displayed according to detection of the situation where the screen of the electronic device 703 is turned on, the electronic device 703 may transmit information regarding the situation where the screen of the electronic device 703 is turned on to the server 701.

In operation 721, the server 701 updates the weighted situation, based on the information regarding the situation where the push notification is displayed, which is received from the electronic device 703. For example, when the information regarding the situation where the user's input is detected is received from the electronic device 703, the server 701 may update the weight of the situation where the user's input is detected, among the situations where the push notification can be output, which are stored in the server 701. In another example, when the information regarding the situation where the screen of the electronic device 703 is turned on is received from the electronic device 703, the server 701 may update the weight of the situation where the screen of the electronic device is turned on, among the situations where the push notification can be output, which are stored in the server 701.

Figure 8:
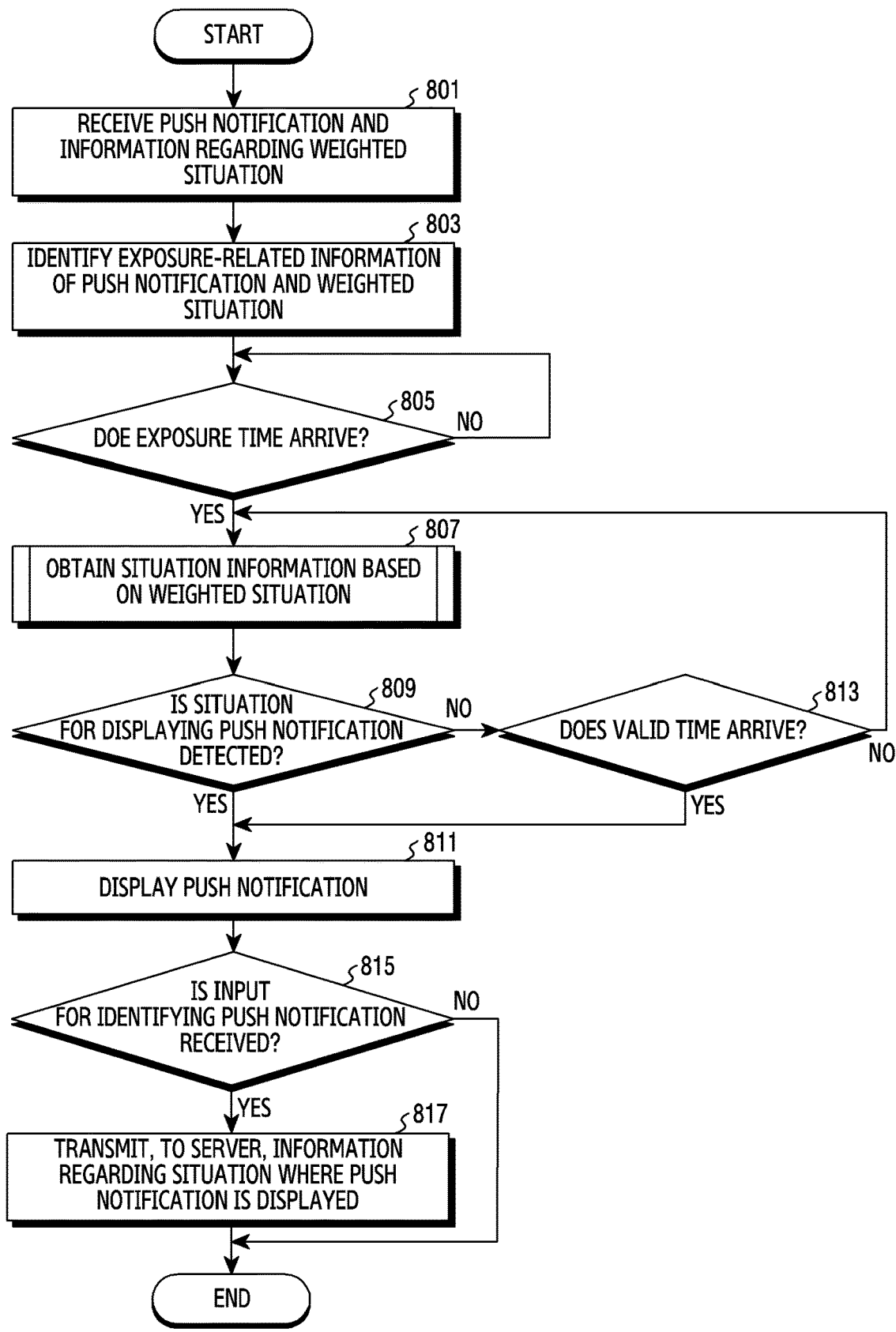
FIG. 8 is a flowchart of a method of displaying a push notification through a screen of an electronic device in the electronic device, according to an embodiment.

FIG. 8 is a flowchart of a method for displaying a push notification through a screen of an electronic device in the electronic device, according to an embodiment.

Referring to FIG. 8, in operation 801, the processor 120 receives a push notification (e.g., exposure-related information or a characteristic category) and information regarding a weighted situation through the communication module 190.

In operation 803, the processor 120 identifies the exposure-related information of the push notification and the weighted situation. For example, the processor 120 may identify at least one of an exposure time of the push notification, a valid time of the push notification, a main text message of the push notification, a priority of the push notification, or the weighted situation, by parsing the push notification and the information regarding the weighted situation, received from the server 108.

In operation 805, the processor 120 determines whether the exposure time arrives. For example, the processor 120 may determine whether a current time reaches the exposure time. When the current time does not reach the exposure time, the processor 120 performs operation 805 again to determine whether the exposure time arrives.

When it is determined that the exposure time arrives (Yes in operation 805), the processor 120 obtains context information based on the weighted situation in operation 807. For example, when the weighted situation is a situation where the display device 160 is turned on, the processor 120 may obtain information regarding a state (e.g., on/off) of the display device 160 for a specified time. In another example, when the weighted situation is a situation where a screen of an application related to the push notification is displayed on the display device 160, the processor 120 may obtain information regarding an application displayed on the display device 160 for the specified time. According to an embodiment, when the weighted situation is not detected for the specified time, the processor 120 may also obtain additional context information related to a situation that is not given a weight in order to detect a situation where the push notification can be output. For example, when the weighted situation is the situation where the display device 160 is turned on, the processor 120 may additionally obtain information regarding a situation which is not given a weight, but where the push notification can be output (e.g., information for determining whether the electronic device 101 is used or information regarding an application which is being executed in the electronic device 101).

In operation 809, the processor 120 determines whether the situation where the push notification can be output is detected, based on the context information. For example, when the specified time does not elapse, the processor 120 may determine whether the weighted situation is detected based on the context information related to the weighted situation. In another example, when the specified time elapses, the processor 120 may determine whether the situation where the push notification can be output is detected, based on the context information related to the weighted situation and the information regarding the situation which is not given a weight, but where the push notification can be output.

When it is determined that the situation where the push notification can be output is detected (Yes in operation 809), the processor 120 controls the display device 160 to display the push notification in operation 811. According to an embodiment, the electronic device 101 may provide an additional effect at the same time as displaying the push notification on the display device 160. For example, the processor 120 may control at least one of the sound output device 155 or the motor to output a sound (e.g., a notification sound) or a vibration when displaying the push notification. According to an embodiment, when the number of push notifications that should be displayed exceeds the number of push notifications that can be displayed on the display device 160, the processor 120 may control the display device 160 to display only some of the plurality of push notifications. For example, the processor 120 may identify priorities of the plurality of push notifications. The processor 120 may select as many push notifications as a number of push notifications specified in order from the highest priority, or a maximum number of push notifications that can be displayed on the display device 160. The processor 120 may control the display device 160 to display the selected push notification. In another example, the processor 120 may identify valid times of the plurality of push notifications. The processor 120 may select as many push notifications as a number of push notifications specified in order from the earliest valid time, or a maximum number of push notifications that can be displayed on the display device 160. The processor 120 may control the display device 160 to display the selected push notification.

When the situation where the push notification can be output is not detected (No in operation 809), the processor 120 determines whether the valid time of the push notification arrives in operation 813. For example, the processor 120 may determine whether the valid time arrives by comparing a current time and the valid time of the push notification. When it is determined that the valid time arrives, the processor 120 performs operation 811 to display the push notification. When it is determined that the valid time does not arrive in operation 813, the processor 120 performs operation 807 again to obtain the context information based on the weighted situation.

In operation 815, the processor 120 determines whether an input for identifying the push notification is received when the push notification is displayed. For example, the processor 120 may determine whether an input for identifying the push notification (e.g., a long touch input, a tap input, or a swipe input) is received for a specified time after the push notification is displayed. When the input for identifying the push notification is not detected for the specified time, the processor 120 may finish the present algorithm.

When it is determined that the input for identifying the push notification is received (Yes in operation 815), the processor 120 transmits information regarding the situation where the push notification is displayed to the server 108 through the communication module 190 in operation 817. For example, when the push notification is displayed according to detection of the situation where the screen of the application related to the push notification is displayed, the processor 120 may transmit, to the server 108 through the communication module 190, information regarding the situation where the screen of the application related to the push notification is displayed. In this case, the server 108 may update the weighted situation based on the information regarding the situation where the push notification is displayed, which is transmitted from the electronic device 101. According to an embodiment, the processor 120 may transmit, to the server through the communication module 190, identification information of the electronic device 101 with the information regarding the situation where the push notification is displayed. In this case, the server 108 may distinguish the information received from the electronic device 101 from information received from other electronic devices by using the identification information of the electronic device 101, and may determine the weighted situation by using the distinguished information. Accordingly, the server 108 may provide optimized information to the electronic device 101.

In the above-described example, when the input for identifying the push notification is detected, the electronic device transmits the information regarding the situation where the push notification is displayed to the server. However, a transmission time of the information regarding the situation where the push notification is displayed is not limited thereto. For example, the processor 120 may store the information regarding situations where the push notification is displayed in the memory 130 every time the input for identifying the push notification is detected. The processor 120 may transmit, to the server 108 through the communication module 190, the information regarding the situations where the push notification is displayed at a time that a size of the information regarding the situations where the push notification is displayed exceeds a reference size. In another example, the processor 120 may transmit, to the server 160 through the communication module 190, the information regarding the situations where the push notification is displayed at a specified time (e.g., 11 p.m.).

In the above-described example, the electronic device receives the information related to the weighted situation from the server, and transmits the information regarding the situation where the push notification is output to the server, such that the weighted situation is updated. However, according to various embodiments of the present disclosure, the electronic device may determine a weighted situation by itself without intervention of the server. For example, when the input for identifying the push notification is detected, the processor 120 may determine a situation that is to be weighted by itself, by recording the situation where the push notification is displayed on the memory 130.

Figure 9:
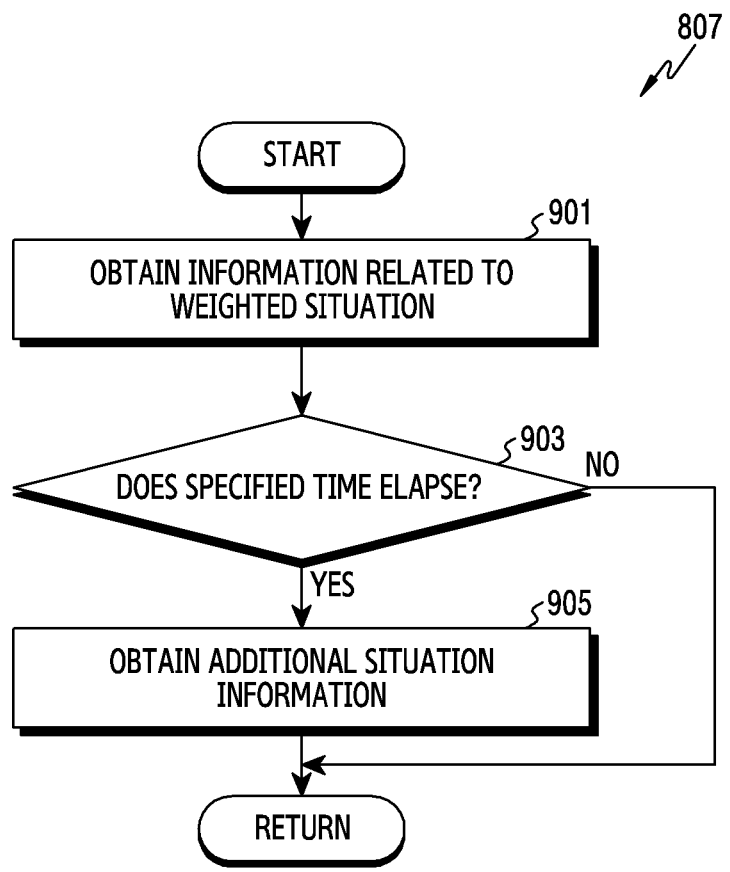
FIG. 9 is a flowchart of a method for obtaining context information in an electronic device, according to an embodiment.

FIG. 9 is a flowchart of a method for obtaining context information in an electronic device, according to an embodiment.

Referring to FIG. 9, in operation 901, the processor 120 obtains context information related to a weighted situation. For example, when the weighted situation is a situation where a screen of an application related to a push notification is displayed, and when the display device 160 is turned on or the screen of the electronic device 101 is unlocked, the processor 120 may obtain information regarding an application which is being executed in the electronic device 101 (or information regarding an application displayed on the display device 160). In another example, when the weighted situation is a situation where a user's input is received, and when the display device 160 is turned on or the screen of the electronic device 101 is unlocked, the processor 120 may obtain information regarding whether the user input is received through the input device 150 or the display device 160. In another example, when the weighted situation is a situation where the user stares at the display device 160 of the electronic device 101, and when the display device 160 is turned on or the screen of the electronic device 101 is unlocked, the processor 120 may obtain information regarding whether the user stares at the display device 160 through a camera, an infrared sensor, or an iris sensor.

In operation 903, the processor 120 determines whether a specified time elapses after an exposure time arrives. For example, after the exposure time arrives, the processor 120 may determine whether a time set by the user (e.g., 10 minutes) elapses. When the specified time does not elapse after the exposure time arrives, the processor 120 performs operation 809 in FIG. 8 to determine whether the situation where the push notification can be output is detected, based on the obtained context information.

When it is determined that the specified time elapses after the exposure time arrives (Yes in operation 903), the processor 120 also obtains additional context information related to a situation that is not given a weight in operation 905. For example, the processor 120 may obtain context information related to all situations where the push notification can be output (e.g., information for determining whether the electronic device 101 is used and information regarding an application which is being executed in the electronic device 101). When the context information related to all situations where the push notification can be output is obtained, the processor 120 performs operation 809 in FIG. 8 to determine whether the situation where the push notification can be output is detected based on the obtained information.

Figure 10:
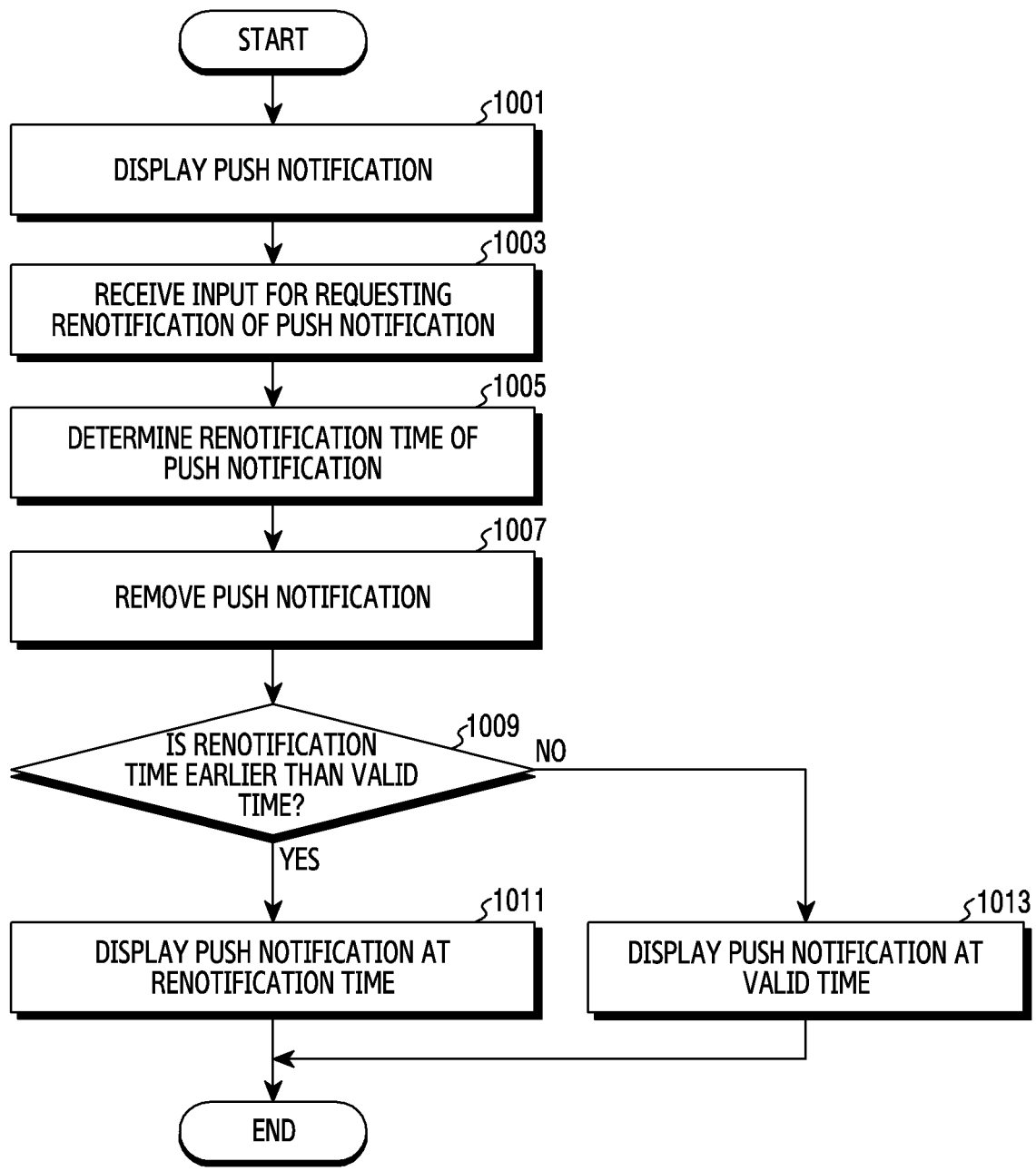
FIG. 10 is a flowchart of a method for re-notifying a push notification in an electronic device, according to an embodiment.
Figure 11A:
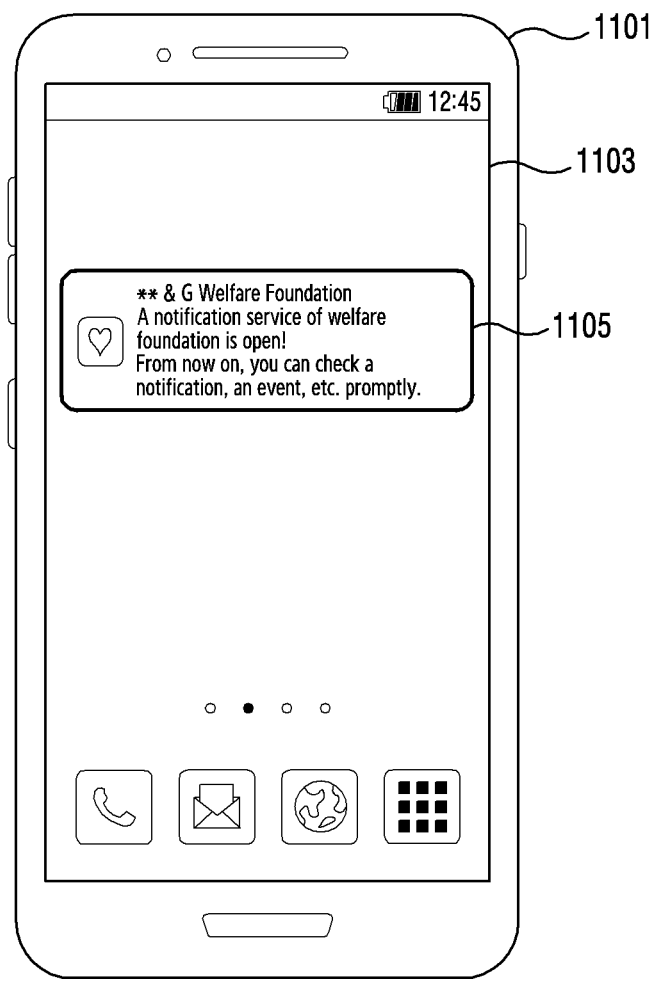
FIG. 11A and FIG. 11B are views illustrating examples of screen configurations for setting a renotification of a push notification in an electronic device, according to an embodiment.
Figure 11B:
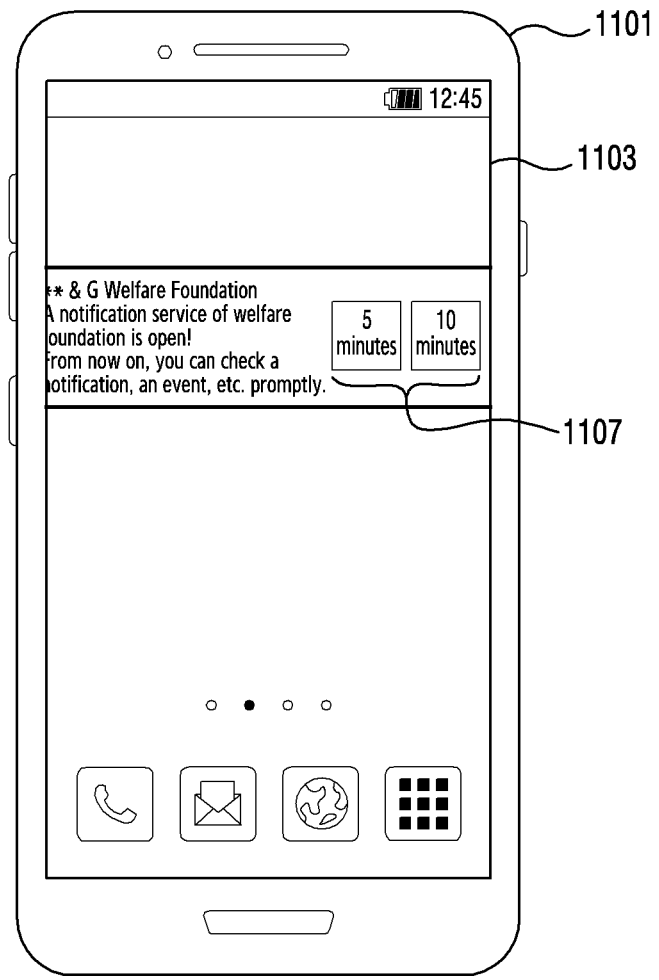

FIG. 10 is a flowchart of a method for re-notifying a push notification in an electronic device, according to an embodiment. FIG. 11A and FIG. 11B are views showing an example of a screen configuration for setting a renotification of a push notification in an electronic device, according to an embodiment.

Referring to FIG. 10 in operation 1001, the processor 120 controls the display device 160 to display a push notification. For example, as shown in FIG. 11A, the processor 120 may control the display device 160 to display a push notification 1105 on a screen 1103 of an electronic device 1101. According to an embodiment, when the push notification is displayed, the processor 120 may control at least one of the sound output device 155 or the motor to provide an additional effect such as a sound (e.g., a notification sound) or a vibration when displaying the push notification.

In operation 1003, the processor 120 receives an input for requesting a renotification of the push notification for a specified time after the push notification has been displayed. For example, the processor 120 may receive a swipe input of a first direction (e.g., an upward, downward, leftward, or rightward direction) on the push notification displayed on the display device 160. In another example, the processor 120 may receive a tap touch input on the push notification displayed on the display device 160. In another example, the processor 120 may receive a long touch input on the push notification displayed on the display device 160.

In operation 1005, the processor 120 determines a renotification time of the push notification. For example, as shown in FIG. 11B, when the input for requesting the renotification of the push notification is received, the processor 120 may control the display device 160 to display icons 1107 for setting the renotification time of the push notification on the screen 1103 of the electronic device 1101. When an input for selecting one of the icons 1107 for setting the renotification time of the push notification is received, the processor 120 may determine a time corresponding to the selected icon as the renotification time of the push notification. For example, when the icon of "5 minutes" is selected, the processor 120 may determine a time 5 minutes after a current time as the renotification time of the push notification.

In operation 1007, the processor 120 controls the display device 160 to remove the push notification. For example, in response to the renotification time of the push notification being determined, the processor 120 may control the display device 160 not to display the push notification.

In operation 1009, the processor 120 determines whether the renotification time of the push notification is earlier than a valid time of the push notification. When the push notification is displayed after the valid time of the push notification, the push notification may be regarded as unnecessary information to the user. Accordingly, the processor 120 may determine whether the renotification time of the push notification is earlier than the valid time of the push notification, by comparing the renotification time of the push notification and the valid time of the push notification, in order to display the push notification for a time during which the push notification has validity.

When it is determined that the renotification time of the push notification is earlier than the valid time of the push notification (Yes in operation 1009), the processor 120 controls the display device 160 to display the push notification at the renotification time of the push notification in operation 1011. For example, the processor 120 may determine whether the renotification time of the push notification arrives. When the renotification time of the push notification arrives, the processor 120 may control the display device 160 to display the push notification.

When it is determined that the renotification time of the push notification is not earlier than the valid time of the push notification (No in operation 1009), the processor 120 displays the push notification at the valid time of the push notification in operation 1013. For example, the processor 120 may determine whether the valid time of the push notification arrives. When the valid time of the push notification arrives, the processor 120 may control the display device 160 to display the push notification.

According to an embodiment of the present disclosure, when the input for requesting the renotification of the push notification is received, the processor 120 may display a window for inputting a renotification time of the push notification, and may determine the time inputted by the user as the renotification time of the push notification.

According to an embodiment of the present disclosure, when the input for requesting the renotification of the push notification is received, the processor 120 may determine a time after a specified time (e.g., 5 minutes, 10 minutes) elapses as the renotification time of the push notification.

According to an embodiment of the present disclosure, when the push notification is displayed, the processor 120 may control the display device 160 to display an icon for setting the renotification of the push notification with the push notification.

According to an embodiment of the present disclosure, an operating method of the electronic device 101 may include receiving a push notification from the server 108; obtaining context information of the electronic device 101 based on an exposure time of the push notification; determining whether a situation where the push notification is enabled to be output is detected, based on the context information; and displaying the push notification through a display (e.g., the display device 160) of the electronic device 101 when the situation where the push notification is enabled to be output is detected.

According to an embodiment of the present disclosure, the push notification may include information related to at least one of exposure-related information or a characteristic category, and the context information of the electronic device 101 may include at least one of information for determining whether the electronic device is used, or information regarding an application which is executed in the electronic device.

According to an embodiment of the present disclosure, the operating method of the electronic device 101 may further include, when the push notification is received, identifying the exposure-related information of the push notification, and the exposure-related information may include at least one of an exposure time, a valid time, a main text message, or a priority.

According to an embodiment of the present disclosure, the operating method of the electronic device 101 may further include, when the situation where the push notification is enabled to be output is not detected, determining whether the valid time arrives, and, when the valid time arrives, displaying the push notification via the display.

According to various embodiments of the present disclosure, the operating method of the electronic device 101 may further include identifying the characteristic category of the push notification; and, when the characteristic category is an event notification, obtaining the context information.

According to an embodiment of the present disclosure, the operating method of the electronic device 101 may further include, when the push notification is an update notification, identifying an update setting of the electronic device; and obtaining the context information based on the update setting.

According to an embodiment of the present disclosure, the operating method of the electronic device 101 may further include, when information regarding a weighted situation is received from the server 108, obtaining the context information based on the information regarding the weighted situation.

According to an embodiment of the present disclosure, obtaining the context information of the electronic device 101 based on the information regarding the weighted situation may include obtaining the information regarding the weighted situation for a specified time; and, when the weighted situation is not detected for the specified time, obtaining context information related to the situation where the push notification is enabled to be output.

According to an embodiment of the present disclosure, the operating method of the electronic device 101 may further include, when an input for identifying the push notification is detected, transmitting information regarding a situation where the push notification is displayed to the server 108.

According to an embodiment of the present disclosure, the operating method of the electronic device 101 may further include, when an input for requesting a renotification of the push notification is received, determining a renotification time of the push notification, when the renotification time is earlier than the valid time, displaying the push notification via the display at the renotification time; and, when the renotification time is later than the valid time, displaying the push notification via the display at the valid time.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   at least one sensor;
   a display;
   a communication circuit; and
   a processor coupled with the at least one sensor, the display and the communication circuit,
   wherein the processor is configured to:
   control the communication circuit to receive, from a server, a push notification with information regarding a weighted situation of the push notification, wherein the server selects the weighted situation having the highest weight of a plurality of weighted situations;
   in response to receiving the information regarding the weighted situation, obtain context information of the electronic device regarding the weighted situation for a specified time using the at least one sensor;
   determine whether the weighted situation is detected, based on the context information obtained during the specified time; and
   display, via the display, the push notification when the weighted situation is detected, wherein the server updates the weights of one of the plurality of weighted situations based on the situation where the push notification is displayed.

2. The electronic device of claim 1, wherein the push notification comprises information related to at least one of exposure-related information or a characteristic category, and
   wherein the context information of the electronic device comprises at least one of information for determining whether the electronic device is used, or information regarding an application which is executed in the electronic device.

3. The electronic device of claim 2, wherein, when the push notification is received, the processor is configured to identify the exposure-related information of the push notification, and
   wherein the exposure-related information comprises at least one of an exposure time, a valid time, a main text message, or a priority.

4. The electronic device of claim 3, wherein, when the situation where the push notification is enabled to be output is not detected, the processor is configured to determine whether the valid time arrives, and
   wherein, when the valid time arrives, the processor is configured to display, via the display, the push notification.

5. The electronic device of claim 3, wherein, when an input for requesting a renotification of the push notification is received, the processor is configured to determine a renotification time of the push notification,
   wherein, when the renotification time is to arrive earlier than the valid time, the processor is configured to display, via the display, the push notification at the renotification time, and
   wherein, when the renotification time is to arrive later than the valid time, the processor is configured to display, via the display, the push notification at the valid time.

6. The electronic device of claim 2, wherein the processor is configured to identify the characteristic category of the push notification, and, when the characteristic category is an event notification, to obtain the context information.

7. The electronic device of claim 6, wherein, when the push notification is an update notification, the processor is configured to identify an update setting of the electronic device, and to obtain the context information based on the update setting.

8. The electronic device of claim 1, wherein, when an input for identifying the push notification is detected, the processor is configured to transmit information regarding a situation where the push notification is displayed to the server through the communication circuit.

9. An operating method of an electronic device, comprising:
   receiving a push notification with information regarding a weighted situation of the push notification from a server, wherein the server selects the weighted situation having the highest weight of a plurality of weighted situations;
   in response to receiving the information regarding the weighted situation, obtaining context information of the electronic device regarding the weighted situation for a specified time using at least one sensor of the electronic device;
   determining whether the weighted situation is detected, based on the context information obtained during the specified time; and
   displaying, via a display of the electronic device, the push notification when the weighted situation is detected, wherein the server updates the weights of one of the plurality of weighted situations based on the situation where the push notification is displayed.

10. The operating method of claim 9, wherein the push notification comprises information related to at least one of exposure-related information or a characteristic category, and
    wherein the context information of the electronic device comprises at least one of information for determining whether the electronic device is used, or information regarding an application which is executed in the electronic device.

11. The operating method of claim 10, further comprising, when the push notification is received, identifying the exposure-related information of the push notification, and
    wherein the exposure-related information comprises at least one of an exposure time, a valid time, a main text message, or a priority.

12. The operating method of claim 11, further comprising:
    when the situation where the push notification is enabled to be output is not detected, determining whether the valid time arrives, and
    when the valid time arrives, displaying, via the display, the push notification.

13. The operating method of claim 11, further comprising:
    when an input for requesting a renotification of the push notification is received, determining a renotification time of the push notification,
    when the renotification time is to arrive earlier than the valid time, displaying, via the display, the push notification at the renotification time; and when the renotification time is to arrive later than the valid time, displaying, via the display, the push notification at the valid time.

14. The operating method of claim 10, further comprising:

identifying the characteristic category of the push notification; and when the characteristic category is an event notification, obtaining the context information.

15. The operating method of claim 14, further comprising:

when the push notification is an update notification, identifying an update setting of the electronic device; and obtaining the context information based on the update setting.

16. The operating method of claim 9, further comprising, when an input for identifying the push notification is detected, transmitting information regarding a situation where the push notification is displayed to the server.

* * * * *